Jan. 31, 1956

C. B. KIMBLE 2,733,418

SELF-CLAMPING TEST PRONG

Filed Sept. 14, 1953

INVENTOR.
Creighton B. Kimble
BY
Harold F. Scribner
ATTORNEY

United States Patent Office 2,733,418
Patented Jan. 31, 1956

2,733,418
SELF-CLAMPING TEST PRONG

Creighton B. Kimble, Madison, N. J., assignor to Stavid Engineering, Inc., Plainfield, N. J., a corporation of New Jersey Application September 14, 1953, Serial No. 379,889

1 Claim. (Cl. 339—108)

This invention relates to electrical testing equipment and more particularly to a test prong that will automatically clamp itself securely to the head of a terminal screw and form therewith an efficient electrical conductor.

A primary purpose of a test prong of this invention is to provide an efficient and effective tool for sampling the voltage or current at any one of a bank of closely spaced terminals, such as one finds for example, in the standard Jones type terminal strip. Heretofore it was customary to sample the current at a terminal by pressing a pointed prong against the head of the screw or by holding the conventional alligator clip against the screw. With such devices, however, the accuracy of the reading depended largely upon the firmness with which the probe was held in contact with the terminal. If lightly held, the contact or electrical connection was poor and if firmly held the connection was good and the recording instrument or indicator responded accordingly. Moreover, the use of the conventional prong or test probe required the constant attention and vigilance of the operator in seeing to it that the prong did not slip off the terminal or from one terminal to another thus making the testing of the voltage or current in the various circuits a tedious and time consuming operation.

The present invention aims to overcome the difficulties encountered with the prior test prongs and to provide a type of prong that will automatically clamp itself securely to the terminal screw with a uniform degree of pressure or tightness every time so that a uniform area of electrical contact is made on every test. The invention further aims to provide a test prong that not only is self-clamping to attain efficient electrical conductivity, but is self-clamping with a degree of force or tenacity that is adequate to support the prong and a reasonable length of lead wire against falling or inadvertent dislodgement from the terminal after it has been applied.

The invention further aims to render available a compact relatively small-gauge test instrument that may be effectively used in confined or restricted quarters and which is rendered self-securing by the mere operation of pressing the end of the prong against the terminal screw and which is as easily detached by affirmatively withdrawing the instrument therefrom. In realizing the objectives of this invention it is proposed to employ a metal tube having good current conducting properties and to incase same with insulation to form a handle. The interior of one end of the tube forms a female socket for a corded jack-plug, whereas, the other end of the tube is constructed to mount relatively movable contact and prong-clamping elements. The contact elements are preferably located at the extreme end of the assembled instrument and form with the handle portion a slender substantially uniform diametered tool. One of the contact elements is securely mounted to the metal tube and the other which may be a pair is mounted to move axially and angularly relatively thereto. A combined torsion and compression spring is embodied in the end of the tool for imparting relative angular movement to the contact elements which causes them when inserted in the cross slot of a conventional terminal screw to impinge against opposite sides of the screw slot with a force adequate to assure the making of an efficient electrical connection and to hold the instrument firmly thereto.

A tool embodying one or more principles of this invention finds convenient use, for example, in testing the current terminal that is covered or partly covered by a panel and accessible only through a small opening in the panel. The device is particularly useful in obtaining a secure clamp and electrical connection on a recessed terminal or a terminal nested between barrier elements of a Jones or similar type of strip. In such instances lateral mobility of a test prong is severely restricted if not an impossibility and the direct-acting clamp-to features of the instant invention in combination with the certainty of obtaining an electrical connection with a constant force X area factor of contact renders a device so constructed a practical instrument useful in many fields.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:

Figure 1 of the drawings is a face view of a portion of a Jones type of strip having recessed terminal screws.

Figure 3:
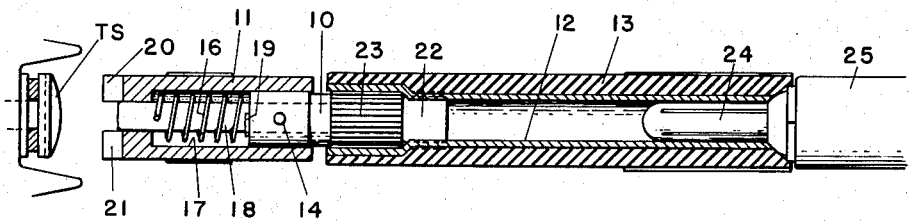
Fig. 3 is a longitudinal sectional view on an enlarged scale of the self-clamping test prong with the parts in position ready for attachment to a terminal.
Figure 4:
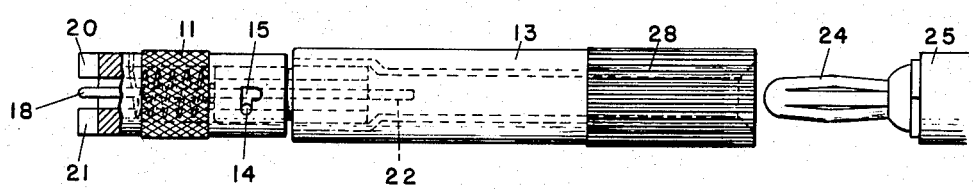
Fig. 4 is an elevational view, partly in section, of Fig. 3, with the lead cord coupling detached and with the parts in the position they tend to assume after being pressed against a terminal screw.

Referring more particularly to Figures 3 and 4, the structure of a preferred form of testing prong is disclosed comprising four major elements, namely, a spindle element 10 which mounts a reciprocable and oscillatable sleeve element 11 and fixedly carries a combination anchor- and electrical-conductor coupling-tube 12, the latter being exteriorly covered with an insulating material 13 so as to function as a handle. The movement of sleeve 11 relative to the spindle 10 is limited axially and angularly by means of a spindle-carried pin 14 that operates in an L-shaped slot 15 in the sleeve wall, and both motions being under the influence of a combined torsion and compression spring 16 that is confined within the bore 17 of the sleeve. The spring 16 is anchored at one end to a centrally disposed relatively flat contact element 18 by being tightly bent around the shank thereof as indicated at 19 in Fig. 3, whereas, the other end 20 of the spring is turned radially outwardly and enters a hole 21 provided in the wall of the sleeve. When assembled, the spring is torsionally loaded so that it tends to rotate the sleeve counterclockwise in Figs. 5 or 6 relative to the contact element 19 and its expandable force normally tends to project the end of the sleeve past the end of the contact element. Fig. 3 illustrates the position of the parts with the sleeve extended but not rotated, and Fig. 4 illustrates the device with the sleeve retracted and rotated.

Figure 5:
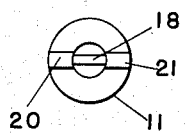
Figs. 5 and 6 are end views of Figs. 3 and 4, respectively.

As illustrated in Figs. 3 and 5, the extreme outer end of the sleeve 11 is formed with two diametrically opposite lugs 20 and 21 each having a width or thickness a little less than the width of the cross slot in the head of the conventional terminal screw.

The central contact element extends through an axial bore in the spindle element and is provided with an enlarged head end 22 that is pressed into the coupling-tube 12 and locks against the inner end of the spindle. The coupling-tube 12 also receives with a press fit joint the inner end of the spindle 10. So that the coupling-tube, spindle and contact blade element are firmly as well as electrically locked together, the head end 22 of contact element is first pressed into the tube and during the operation it broaches its own locking channels, and thereafter the spindle is pressed into the end of the tube and against the head 22 of the blade element. To obtain a more secure union of the parts, the spindle may be axially ribbed or serrated around its periphery as indicated at 23.

The outer end of the coupling-tube 12 is open and is adapted to receive a jack-plug of the expansible spring type indicated at 24. The jack 24 is provided with an insulating sheath 25 that covers its soldered connection of the lead cord 26. The other end of the lead cord may be provided with another male jack 27 adapted to be inserted in a receptacle of an instrument panel. To assure safety in operation, a relatively heavy layer of insulation 13 is applied over the entire coupling-tube, one end of which may be knurled or ribbed as at 28.

Operation

Figure 1:
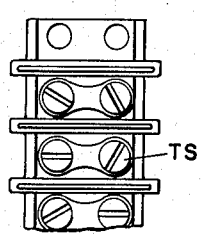
Figure 2:
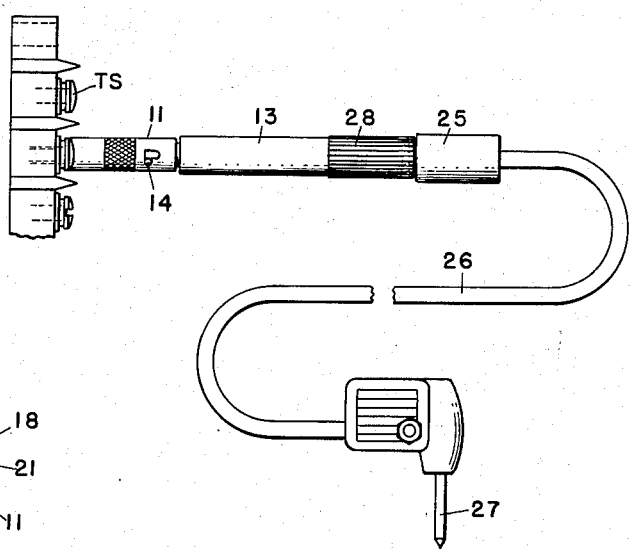
Fig. 2 is a side view of a terminal strip with the test prong of this invention attached to and self-supported by one of the terminal screws.
Figure 6:
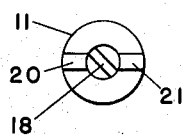

In using the self-clamping prong of this invention one will first rotate the sleeve relative to the spindle and insulated handle to a position illustrated in Figs. 3 and 5. In this position the flat contact element lies in the diametral plane of the end lugs 20 and 21 of the sleeve, but withdrawn from or in a receded position relative to the lugs. In this position the spindle pin 14 will be at the handle end of the L-shaped slot in the sleeve. With the parts so conditioned the lugs 20 and 21 are directed into the slot of a terminal screw TS and with a slight forward pressure applied through the insulated handle, the contact element 18 is advanced relative to the sleeve and against spring 16 so that its extreme forward end is also caused to enter the screw-head slot. The relative axial displacement of the parts is substantially equal to the depth of the screw head slot and when the blade 18 has overtaken the sleeve that amount the circumferential portion of the L-slot in the sleeve will have been reached by the pin 14. When that occurs the stored torque in the spring 16 imparts a turning movement to the sleeve relative to the blade contact element so that the lugs 20 and 21 tend to take up a position such as indicated in Fig. 6, in relation to the plane of the contact element 18. Inasmuch as the contact element 18 is relatively wide in relation to the width of a screw slot the relative turning of the sleeve lugs and the contact element causes opposite outer corners of each to impinge firmly against the opposed inner sides of the slot in the terminal screw. A secure electrical connection of substantially constant force X area factor is thereupon instantly made. This gripping power of the prong is great enough to support the prong in horizontally extended position, indicated in Fig. 2, without manual aid.

After attaching the prong in this manner, the voltage or current at that particular terminal is taken in a preferred or recommended manner through the positive connection established by the metal coupling-tube 12 with the imbedded head 22 of the contact element 18 at one end and by the jack plug 24—25, or other desired connection at the other end.

In releasing the prong from a terminal, the coupling-tube 12 is rotated counterclockwise as viewed in Fig. 6, which will again bring the plane of the contact element 18 into the plane of the lugs 20 and 21, and the pin 14 to the axially extending portion of the L-slot 15 in the sleeve. Endwise pressure on the handle 13 is relieved whereupon the compression spring 16 advances the lugs 20—21 relative to the element 18 until the spindle pin 14 is locked in the axial portion of the slot in the sleeve. In this locked preset condition the test-prong assembly is removed from the terminal and automatically is ready for another current sampling operation.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claim.

Having thus revealed this invention, I claim as new and desire to secure the following combinations and elements, or equivalents thereof, by Letters Patent of the United States:

A current-tester coupling unit for establishing an electrical connection of substantially constant pressure value with a slotted-terminal element of an electric circuit comprising an electrically conductive tubular element open at one end to receive a terminal fitting of a detachable extension cord, said cord comprising an insulated conductor having a compressible non-insulated male end piece adapted to fit within the open end of said tubular element and establish electrical connection therewith, a sheath of insulation enveloping the exterior of said tubular element, said sheath extending slightly beyond the said open end of the tubular element so as to overlay and surround the exposed portion of the non-insulated male end piece of the said extension cord when the said end piece of the cord is in operative position within the said tube, an elongated electrically-conductive blade member secured within said tube at its other end, said blade member having an end portion adapted to fit within the slot of a terminal element whose current characteristics are to be sampled, said end portion of the blade member being wider than the width of the slot in the terminal element so as to be capable of limited angular movement therein, a metallic and relatively rotatable sleeve member telescoping said blade member, said sleeve having slot-engaging lugs at its outer end adapted also to fit within the slot of the terminal element at opposite sides of said blade member, spring means between the sleeve member and blade member tensioned to revolve said sleeve relative to the blade from a position whereat the sleeve lugs occupy a position coplanar with the blade member that permits free insertion of the blade member and lugs into the slot in the terminal element to a position angularly removed therefrom and whereat diagonally opposite corners of the blade member impinge against opposite side walls of the slot in the terminal element and physically and electrically couple the tester unit to the said terminal element, the said spring means being in the form of a helix and connected to the said blade and sleeve members so as normally to effect limited counterclockwise movement of the blade in the sleeve so that a turning of the tubular member and blade in the opposite direction restores the blade to coplanar relation with the lugs on the sleeve and breaks the previously established constant-pressure electrical connection of the tester unit with the terminal element, and guide means between the said sleeve member and the blade member for limiting the relative angular movement.

References Cited in the file of this patent

UNITED STATES PATENTS

| 2,150,184 | Pearson | Mar. 14, 1939 |
| 2,534,450 | Kadilak | Dec. 19, 1950 |

FOREIGN PATENTS

| 248,614 | Switzerland | Feb. 16, 1948 |
| 729,714 | Germany | Dec. 21, 1942 |